United States Patent [19]

Hubweber

[11] 4,078,778

[45] Mar. 14, 1978

[54] GAS SPRING

[75] Inventor: Franz-Josef Hubweber, Kuppenheim, Germany

[73] Assignee: Stabilus GmbH, Koblenz-Neuendorf, Germany

[21] Appl. No.: 721,665

[22] Filed: Sep. 9, 1976

[30] Foreign Application Priority Data

Sep. 11, 1975 Germany .............................. 2540402

[51] Int. Cl.[2] ............................................... F16F 9/32
[52] U.S. Cl. .................................. 267/65 R; 92/19; 92/23; 188/67; 188/170; 267/124
[58] Field of Search ............ 267/9 R, 9 B, 9 C, 65 R, 267/113, 118, 120, 124, 134; 92/19, 23, 24, 26, 27, 28; 188/67, 129, 170, 300

[56] References Cited

U.S. PATENT DOCUMENTS

| | | | |
|---|---|---|---|
| 2,845,902 | 8/1958 | Anderson | 188/67 UX |
| 2,851,995 | 9/1958 | Westcott | 188/170 X |
| 3,203,513 | 8/1965 | Allen | 188/170 |
| 3,207,498 | 9/1965 | Wustenhagen et al. | 267/65 R |
| 3,643,765 | 2/1972 | Hanchen | 188/170 |

*Primary Examiner*—Johnny D. Cherry
*Attorney, Agent, or Firm*—Hans Berman

[57] ABSTRACT

In a gas spring having a cylinder and a piston rod movable within the cylinder, braking elements are provided which brake or block the movement of the piston rod with respect to the cylinder when the interior pressure within the cylinder is reduced below a predetermined pressure. So the risk is eliminated that the piston rod when under load is unintentionally moved into the cylinder with a high velocity when the gas pressure within the cylinder is lowered below the predetermined pressure. The braking elements are spring loaded and are held in an inoperative position by adequate pressure within the cylinder.

14 Claims, 3 Drawing Figures

GAS SPRING

This invention relates to gas springs.

In its more specific aspects the invention is concerned with a gas spring of the type disclosed in the German published application No. 2,402,461. With the known gas spring the piston rod can be mechanically blocked with respect to the cylinder only when the piston rod is in its outermost position.

In another construction which has been disclosed in the German Utility Model No. 1,928,652, mechanical blocking means comprise a handle by which manual blocking is possible in any position of the gas spring.

It is further known to block gas springs by interrupting a passage which connects the chambers on both sides of a piston connected to the piston rod.

It is an object of this invention to provide braking means for gas springs which in case of a loss of the gas pressure in the interior of the cylinder automatically prevent the piston rod from falling into the cylinder independently of the position of the piston rod with respect to the cylinder before the loss of gas pressure occurs. It is a further object of this invention to provide braking means of simple and nonexpensive mechanical construction.

According to the invention, the gas spring comprises braking means for braking the movement of the piston rod with respect to the cylinder. These braking means are biased by spring means towards a braking condition. As long as the pressure in the cylinder of the gas spring exceeds a predetermined value, holding means are effective which hold the braking means in an inoperative position against the action of the spring means.

Other features, additional objects, and many of the attendant advantages of this invention will readily be appreciated as the same becomes better understood by reference to the following detailed description of a preferred embodiment and of a modification of the same, when considered in connection with the appended drawing in which.

Figure 1:
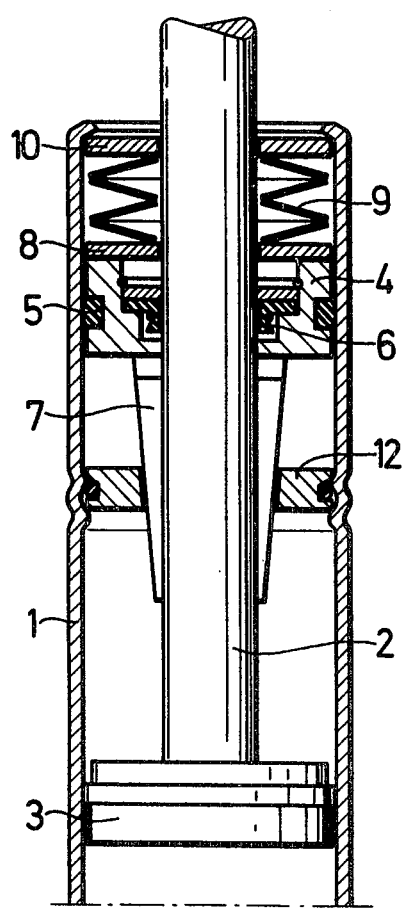
FIG. 1 shows a gas spring of the invention in fragmentary longitudinal section.
Figure 2:
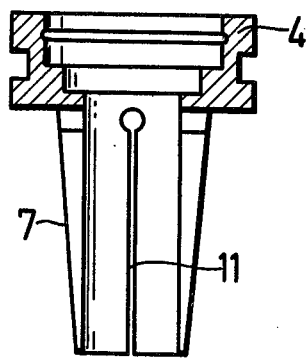
FIG. 2 shows an element of the gas spring of FIG. 1.

Referring now to the drawings in detail, and initially to FIGS. 1 and 2, there is seen a gas spring of the invention comprising a cylinder 1. In cylinder 1 there is provided a piston rod 2 with a piston 3. The piston rod 2 and the piston 3 are axially movable with respect to the cylinder 1. The lower end of the cylinder 1 is closed as is not explicity shown. The chambers within the cylinder 1 below and above the piston 3 are connected by a permanently open passage. Such a permanently open passage is shown for example in U.S. Pat. No. 3,207,498. The pressure of a gas within the cylinder acts on the piston rod so that the piston rod 2 is biased outwardly of the cylinder 1 with a force corresponding to the product of the cross section of the piston rod and the gas pressure. For preventing escape of the pressurized gas out of the cylinder a wall 4 is provided. This wall 4 is sealed to the inner side of the cylinder 1 by a sealing ring 5 and to the piston rod 2 by a sealing ring 6. The wall 4 is axially movable with respect to the cylinder. On the upper side of the wall 4 a disk 8 is positioned. A stack 9 of cup springs engages the disk 8 and is backed by a further disk 10 which is held by the inwardly offset upper edge of the cylinder 1. The wall 4 is provided with a conical chuck collet 7. This collet 7 is provided with axial slots 11 as can be better seen from FIG. 2. The conical outer face of the collet 7 is received with clearance in an equally conical vose of a clamping collar 12 which is axially fixed with respect to the cylinder 1.

As long as a predetermined minimum pressure exists within the cylinder 1 the wall 4 takes the position as shown in FIG. 1 in which position the conical outer face of the collet 7 is spaced from the conical inner face of the collar 12. When the pressure within the cylinder 1 is lowered below said predetermined value the spring means 9 press the wall 4 downwards against the remaining pressure within the cylinder 1. Now the collet 7 comes into engagement with the collar 12 and the collet 7 frictionally engages the piston rod 2 so that the piston rod 2 is blocked or at least braked. This means that the piston rod cannot fall downwardly into the cylinder 1 if for example the piston rod 2 is charged by a downwardly acting load and the cylinder loses gas by leakage.

As can be better seen from FIG. 2 the wall 4 and the collet 7 are formed as one part.

Figure 3:
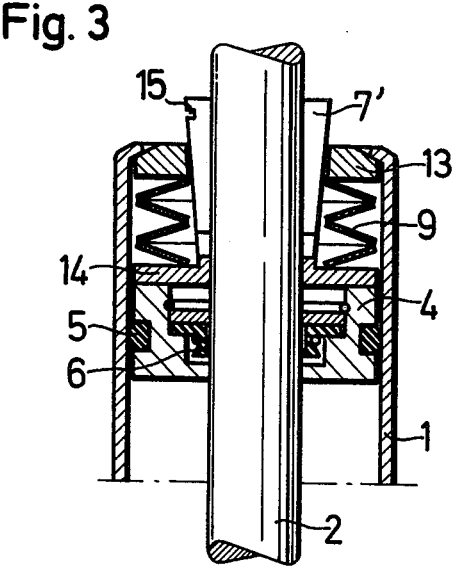
FIG. 3 shows a modification of the gas spring of FIG. 1.

In FIG. 3 a further embodiment is illustrated. In this embodiment the chuck collet 7' is mounted on a disk 14 which disk 14 is supported by the movable wall 4. A clamping collar 13 retained by the offset top edge of the cylinder 1 has a central conical bore receiving the collet 7' and backs the spring stack 9. As long as the pressure within cylinder 1 is high enough, the collet 7' is out of engagement with the collar 13 as shown in FIG. 3. When the pressure in the cylinder 1 falls below a predetermined pressure the disk 14, the collet 7', and the wall 4 are moved downwardly by the spring stack 9 against the action of the residual gas pressure within cylinder 1. So the collet 7' comes into engagement with the clamping collar 13 and the collet 7' brakes or even blocks the piston rod 2 by frictional engagement.

The collet 7' is provided with bores 15. So it is possible to grip the collet 7' by means of a tool and to pull the collet 7' out of engagement with the collar 13 if it is desired to axially move the braked or blocked piston rod 2.

The invention has been described so far with respect to a gas spring which cannot be blocked pneumatically or hydraulically. Such a spring is for example used in cars for counter balancing the weight of the hood. The braking means according to this invention prevent such a hood from moving downwardly with great velocity if the cylinder leaks.

The braking means of this invention are also applicable to gas springs as described in U.S. Pat. No. 3,388,883, in which gas springs the piston rod can be blocked by interrupting the passage between the chambers on both sides of the piston. Such gas springs may be used for example in drawing tables for balancing the weight of the drawing table during adjusting movement and for blocking the drawing table when the desired height has been adjusted. In such cases there exists also the risk that the drawing table sinks down with high velocity when the gas pressure is lost due to untightness of the cylinder. The braking means of this invention prevent such falling down of the table.

The gas spring can be modified without leaving the basic idea of the invention. For example it is possible to replace the cup springs by other kinds of springs. Further it is possible to fix the collet 7 of the chuck on the cylinder 1 and to mount the collar 12 on the movable wall 4.

The use of cup springs is favourable because the total spring force can be varied by changing the number of the cup springs.

What is claimed is:

1. A gas spring comprising:
   (a) a cylinder having an axis and radially defining therein a cavity closed in one axial direction;
   (b) sealing means axially defining said cavity in the other axial direction;
   (c) a piston rod sealingly engaged by said sealing means for axial movement inward and outward of said cavity;
   (d) a body of gas in said cavity, the pressure of said gas being at least equal to atmospheric pressure and biasing said piston rod outward of said cavity when the pressure thereof is higher than atmospheric pressure;
   (e) braking means secured to said cylinder;
   (f) spring means mounted on said cylinder and biasing said braking means toward a position of engagement with said piston rod, said braking means impeding said movement when in said position; and
   (g) holding means secured to said cylinder and responsive to a predetermined minimum pressure of said gas for preventing movement of said braking means into said position.

2. A gas spring according to claim 1, wherein said braking means in said position thereof prevent said inward axial movement of said piston rod.

3. A gas spring according to claim 2, wherein said holding means include a movable wall member in said cylinder, said gas and said spring means exerting pressure on said wall member in opposite respective directions.

4. A gas spring according to claim 3, wherein said wall member is formed with a passage extending axially therethrough and receiving said piston rod, said sealing means sealing said wall member to said piston rod and to said cylinder.

5. A gas spring according to claim 4, wherein said spring means are annular about said piston rod, respective radially extending faces of said wall member being directed axially inwardly and outwardly of said cavity, said spring means engaging said outwardly directed face.

6. A gas spring according to claim 5, further comprising means axially defining a chamber in said cylinder communicating with the ambient atmosphere and receiving said spring means.

7. A gas spring according to claim 5, wherein said spring means include at least one cup spring.

8. A gas spring according to claim 1, wherein said braking means include a collet chuck having a collet member receiving said piston rod and a clamping member engageable with said collet member for tightening said collet member about said piston rod, one of said members of the chuck being axially secured to said cylinder, and the other member of said chuck being axially movable in response to forces exerted by said spring means and said holding means.

9. A gas spring according to claim 8, wherein said clamping member is apertured and has an inner face in the aperture thereof, said collet member being received in said aperture and having an outer face opposite said inner face, at least one of said faces being conical.

10. A gas spring according to claim 8, wherein said one member is said clamping member.

11. A gas spring according to claim 10, wherein said holding means include a wall member axially movable in said cylinder and secured to said collet member.

12. A gas spring according to claim 11, wherein said sealing means seal said wall member to said cylinder, said wall member bounding said cavity, said collet member extending inward of said cavity from said wall member, and said clamping member being secured to said cylinder in said cavity.

13. A gas spring according to claim 11, wherein said clamping member is axially offset from said wall member outward of said cavity, and said collet member extends from said wall member toward said clamping member.

14. A gas spring according to claim 13, wherein said collet member has an annular disc portion having two radially extending faces respectively engaging said spring means and said wall member.

* * * * *